United States Patent
Matsuhana et al.

(10) Patent No.: US 11,599,990 B2
(45) Date of Patent: Mar. 7, 2023

(54) DETERIORATION DETERMINATION METHOD AND DETERIORATION DETERMINATION DEVICE FOR INDUSTRIAL X-RAY IMAGING APPARATUS

(71) Applicant: Shimadzu Corporation, Kyoto (JP)

(72) Inventors: Bunta Matsuhana, Kyoto (JP); Goro Kambe, Kyoto (JP)

(73) Assignee: Shimadzu Corporation, Kyoto (JP)

(*) Notice: Subject to any disclaimer, the term of this patent is extended or adjusted under 35 U.S.C. 154(b) by 0 days.

(21) Appl. No.: 17/388,428

(22) Filed: Jul. 29, 2021

(65) Prior Publication Data
US 2022/0207683 A1 Jun. 30, 2022

(30) Foreign Application Priority Data

Dec. 24, 2020 (JP) .............................. JP2020-215450

(51) Int. Cl.
*G01T 7/00* (2006.01)
*G06T 7/00* (2017.01)
*H04N 5/32* (2023.01)

(52) U.S. Cl.
CPC ............... *G06T 7/001* (2013.01); *G01T 7/00* (2013.01); *H04N 5/32* (2013.01); *G06T 2207/10116* (2013.01); *G06T 2207/30168* (2013.01)

(58) Field of Classification Search
CPC .......... G06T 7/001; G06T 2207/10116; G06T 2207/30168; G01T 7/00; H04N 5/32
See application file for complete search history.

(56) References Cited

U.S. PATENT DOCUMENTS

| | | | | |
|---|---|---|---|---|
| 2003/0108147 A1* | 6/2003 | Kojima | ............... | A61B 6/4241 378/19 |
| 2011/0073769 A1* | 3/2011 | Enomoto | ............... | G16H 40/40 250/370.08 |

FOREIGN PATENT DOCUMENTS

| JP | 2015058219 A | * | 3/2015 |
|---|---|---|---|
| JP | 6173143 B2 | * | 8/2017 |
| JP | 2020-027101 A | | 2/2020 |

* cited by examiner

*Primary Examiner* — Kiho Kim
(74) *Attorney, Agent, or Firm* — Maier & Maier, PLLC

(57) ABSTRACT

A deterioration determination method in a deterioration determination device configured to determine deterioration of an X-ray detector of an industrial X-ray imaging apparatus, the deterioration determination method including: an acquisition step of acquiring a captured image generated by the X-ray detector; a statistical processing step of generating statistical processing information of the captured image; and a determination step of determining whether or not the X-ray detector has been deteriorated, based on the statistical processing information.

14 Claims, 10 Drawing Sheets

DETERIORATION DETERMINATION METHOD AND DETERIORATION DETERMINATION DEVICE FOR INDUSTRIAL X-RAY IMAGING APPARATUS

INCORPORATION BY REFERENCE

The present application claims priority under 35 U.S.C. § 119 to Japanese Patent Application No. 2020-215450 filed on Dec. 24, 2020. The content of the application is incorporated herein by reference in its entirety.

BACKGROUND

The present invention relates to a deterioration determination method and a deterioration determination device for an industrial X-ray imaging apparatus.

An X-ray imaging apparatus that images, using X-rays, an internal structure of a subject is known (See, for example, JP 2020-27101 A).

The X-ray imaging apparatus described in JP 2020-27101 A includes an X-ray generator, an X-ray detector, and a rotary table which is disposed between the X-ray generator and the X-ray detector and on which a subject is placed. That is, the X-ray imaging apparatus is configured as a so-called "industrial X-ray imaging apparatus".

The X-ray imaging apparatus automatically adjusts a tube current value following a change in one pixel size of the acquired image and a tube voltage value.

SUMMARY

However, in the conventional industrial X-ray imaging apparatus such as the X-ray imaging apparatus described in JP 2020-27101 A, X-ray energy emitted from the X-ray generator to the subject is determined based on the material, shape, size, and the like of the subject. Therefore, in the industrial X-ray imaging apparatus, it is difficult to appropriately estimate whether or not the X-ray detector has been deteriorated, as compared with a medical X-ray imaging apparatus.

Therefore, in the conventional industrial X-ray imaging apparatus, the X-ray detector is, for example, replaced when a user recognizes that the quality of the captured image is deteriorated. As a result, the convenience of the industrial X-ray imaging apparatus for the user may be deteriorated.

An object of the present invention is to provide a deterioration determination method and a deterioration determination device for an industrial X-ray imaging apparatus which are capable of appropriately determining whether or not an X-ray detector has been deteriorated.

According to a first aspect of the present invention, there is provided a deterioration determination method in a deterioration determination device configured to determine deterioration of an X-ray detector of an industrial X-ray imaging apparatus, the deterioration determination method including: an acquisition step of acquiring a captured image generated by the X-ray detector; a statistical processing step of generating statistical processing information of the captured image; and a determination step of determining whether or not the X-ray detector has been deteriorated, based on the statistical processing information.

According to a second aspect of the present invention, there is provided a deterioration determination device configured to determine deterioration of an X-ray detector of an industrial X-ray imaging apparatus, the deterioration determination device including: an acquisition section configured to acquire a captured image generated by the X-ray detector; a statistical processing section configured to generate statistical processing information of the captured image; and a determination section configured to determine whether or not the X-ray detector has been deteriorated, based on the statistical processing information.

According to the deterioration determination method and the deterioration determination device for the industrial X-ray imaging apparatus of the aspects of the present invention, the captured image generated by the X-ray detector is acquired, the statistical processing information of the acquired captured image is generated, and whether or not the X-ray detector has been deteriorated is determined based on the generated statistical processing information. Therefore, it is possible to appropriately determine whether or not the X-ray detector has been deteriorated, by appropriately setting the statistical processing information.

DETAILED DESCRIPTION

Hereinafter, embodiments of the present invention will be described with reference to the drawings.

1. Configuration of Industrial X-Ray Imaging Apparatus

Figure 1:
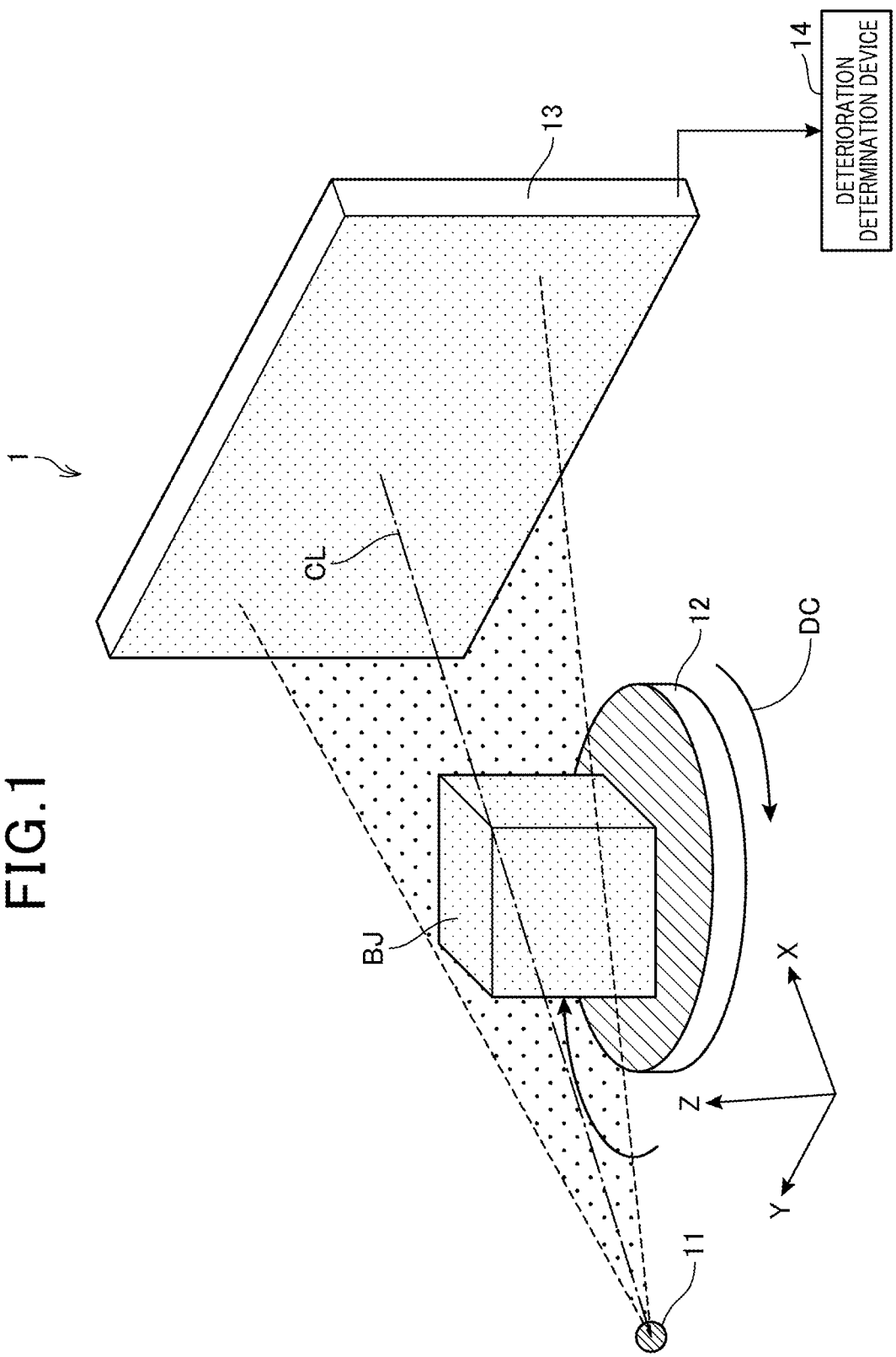
FIG. 1 is a diagram illustrating an example of a configuration of an industrial X-ray imaging apparatus according to the present embodiment.

FIG. 1 is a diagram illustrating an example of a configuration of an industrial X-ray imaging apparatus 1 according to the present embodiment.

As illustrated in FIG. 1, the industrial X-ray imaging apparatus 1 includes an X-ray source 11, a stage 12, an X-ray detector 13, and a deterioration determination device 14.

FIG. 1 illustrates an X axis, a Y axis, and a Z axis orthogonal to each other. For example, the Z axis is parallel to the vertical direction, and the X axis and the Y axis are parallel to the horizontal direction. The X axis is parallel to an irradiation direction of X-rays emitted from the X-ray source 11. In other words, the positive direction of the X axis indicates the irradiation direction of the X-rays emitted from the X-ray source 11. The positive direction of the Z axis indicates the upward direction.

In the following description, the industrial X-ray imaging apparatus 1 may be referred to as an X-ray imaging apparatus 1.

The X-ray source 11 radiates X-rays by being supplied with power from an X-ray power source unit, which is not illustrated, and irradiates a subject BJ placed on the stage 12 with X-rays. In the X-ray source 11, for example, a high voltage supplied from the X-ray power source unit is applied between a cathode and an anode, and electrons emitted from a filament of the cathode collide with the anode, which causes X-rays to be emitted.

A straight line CL indicates an irradiation direction of the X-rays emitted from the X-ray source 11.

The stage 12 is disposed between the X-ray source 11 and the X-ray detector 13, and the subject BJ is placed thereon. The stage 12 is rotationally driven about a rotation axis in a direction parallel to the Z-axis and is configured to be movable in the X-axis direction. An arrow DC indicates the rotation direction of the stage 12.

The subject BJ corresponds to an example of an "imaging object".

The X-ray detector 13 captures an image of the X-rays emitted from the X-ray source 11 and generates a captured image. The X-ray detector 13 includes, for example, a flat panel detector (FPD). The flat panel detector includes a two-dimensional image sensor in which a thin film layer including a scintillator that absorbs energy of X-rays and emits fluorescence is formed on a light receiving surface.

The deterioration determination device 14 is communicably connected to the X-ray detector 13, and determines whether or not the X-ray detector 13 has been deteriorated, based on the captured image generated by the X-ray detector 13.

The configuration of the deterioration determination device 14 will be described with reference to FIG. 2.

In the present embodiment, a case where the deterioration determination device 14 is configured as a part of the industrial X-ray imaging apparatus 1 will be described, but the embodiment of the present invention is not limited thereto. The deterioration determination device 14 may be configured separately from the industrial X-ray imaging apparatus 1.

2. Configuration of Deterioration Determination Device

Next, the configuration of the deterioration determination device 14 will be described with reference to FIG. 2. FIG. 2 is a diagram illustrating an example of the configuration of the deterioration determination device 14 according to the present embodiment.

The deterioration determination device 14 is configured as, for example, a personal computer, and includes a processor 14A such as a central processing unit (CPU) and a micro-processing unit (MPU), a memory device 14B such as a read only memory (ROM) and a random access memory (RAM), a storage device such as a hard disk drive (HDD) and a solid state drive (SSD), and an interface circuit for connecting the X-ray detector 13 and the like.

The deterioration determination device 14 includes an acquisition section 141, a statistical processing section 142, a determination section 143, and an image storage section 144.

Specifically, the processor 14A of the deterioration determination device 14 functions as the acquisition section 141, the statistical processing section 142, and the determination section 143 by executing the control program stored in the memory device 14B. The processor 14A of the deterioration determination device 14 executes the control program stored in the memory device 14B to cause the memory device 14B to function as the image storage section 144.

The image storage section 144 stores a captured image P generated by the X-ray detector 13. The captured image P includes a first captured image P1 and a second captured image P2.

The first captured image P1 indicates the captured image P generated by the X-ray detector 13 in a state where the X-ray source 11 is turned off. The second captured image P2 indicates the captured image P generated by the X-ray detector 13 in a state where the X-ray source 11 is turned on and the subject BJ is not placed on the stage 12.

The first captured image P1 may be referred to as an "offset image". The second captured image P2 may be referred to as an "air image".

The acquisition section 141 acquires the captured image P generated by the X-ray detector 13. The acquisition section 141 stores information indicating the acquired captured image P in the image storage section 144. The captured image P includes a first captured image P1 and a second captured image P2.

The statistical processing section 142 performs statistical processing on the captured image P, generates statistical processing information, and stores the generated statistical processing information in the image storage section 144.

The statistical processing information includes a first average value BA1, a first standard deviation σB1, a second average value BA2, and a second standard deviation σB2.

The first average value BA1 indicates an average value of the luminance of the first captured image P1. The first standard deviation σB1 indicates the standard deviation of the luminance of the first captured image P1. The second average value BA2 indicates an average value of the luminance of the second captured image P2. The second standard deviation σB2 indicates the standard deviation of the luminance of the second captured image P2.

The statistical processing information includes a first ratio PR1 and a second ratio PR2. The first ratio PR1 indicates a ratio of the first average value BA1 in the state where the X-ray detector 13 is exposed to the first average value BA1 when the X-ray detector 13 is in the initial state. The first ratio PR1 indicates deterioration of the sensitivity of the X-ray detector 13. The second ratio PR2 indicates a ratio of the first standard deviation σB1 to the first average value BA1.

The determination section 143 determines whether or not the X-ray detector 13 has been deteriorated, based on the statistical processing information generated by the statistical processing section 142.

Specific examples of the processing of the determination section 143 will be described with reference to FIGS. 4 to 9.

3. Example of Second Captured Image

Figure 3:
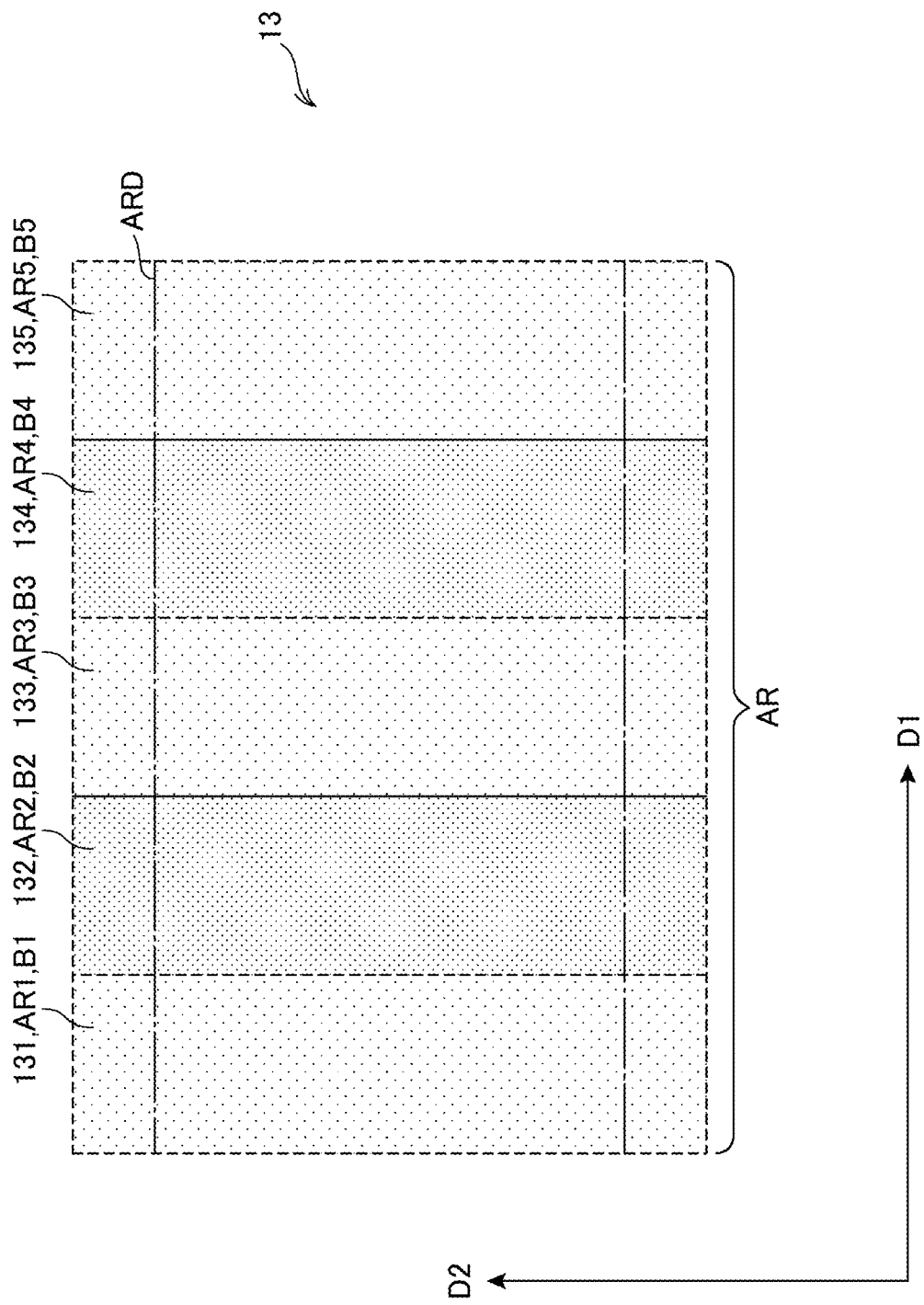
FIG. 3 is a diagram illustrating an example of a second captured image.

FIG. 3 is a diagram illustrating an example of the second captured image P2.

As illustrated in FIG. 3, the two-dimensional image sensor of the X-ray detector 13 includes, for example, five blocks. The five blocks are arranged along a first direction D1. The first direction D1 indicates the negative direction of the Y axis illustrated in FIG. 1. Each of the five blocks is formed in a rectangular shape extending in a second direction D2. The second direction D2 indicates the positive direction of the Z axis illustrated in FIG. 1.

The five blocks include a first block 131, a second block 132, a third block 133, a fourth block 134, and a fifth block 135 arranged along the first direction D1. Each of the first block 131, the second block 132, the third block 133, the fourth block 134, and the fifth block 135 indicates a two-dimensional image sensor integrally formed.

The captured image P of the X-ray detector 13 corresponds to an image of a region AR. The region AR includes a first region AR1, a second region AR2, a third region AR3, a fourth region AR4, and a fifth region AR5. The first region AR1 corresponds to the first block 131. The second region AR2 corresponds to the second block 132. The third region AR3 corresponds to the third block 133. The fourth region AR4 corresponds to the fourth block 134. The fifth region AR5 corresponds to the fifth block 135.

A first luminance B1 indicates a luminance detected by the two-dimensional image sensor in the first region AR1, that is, the first block 131. A second luminance B2 indicates a luminance detected by the two-dimensional image sensor in the second region AR2, that is, the second block 132. A third luminance B3 indicates a luminance detected by the two-dimensional image sensor in the third region AR3, that is, the third block 133. A fourth luminance B4 indicates a luminance detected by the two-dimensional image sensor in the fourth region AR4, that is, the fourth block 134. A fifth luminance B5 indicates a luminance detected by the two-dimensional image sensor in the fifth region AR5, that is, the fifth block 135.

When the captured image P is the second captured image P2, as illustrated in FIG. 3, sometimes the luminance values of the first luminance B1 to the fifth luminance B5 are different according to the sensitivities of the two-dimensional image sensors in the first region AR1 to the fifth region AR5, that is, the first block 131 to the fifth block 135. As a result, as illustrated in FIG. 3, the luminance values of the first region AR1 to the fifth region AR5 constituting the second captured image P2 may be different from each other.

When the two-dimensional image sensor of the X-ray detector 13 is deteriorated, sometimes the variation of the luminance values of the first block 131 to the fifth block 135 increases. In such a case, as described with reference to FIG. 8, whether or not the two-dimensional image sensor of the X-ray detector 13 has been deteriorated can be determined, by monitoring the second standard deviation σB2.

In the present embodiment, the statistical processing section 142 performs the statistical processing on the captured image P corresponding to a processing region ARD in the captured image P of the X-ray detector 13 to generate the statistical processing information.

The processing region ARD includes a part of each of the first region AR1 to the fifth region AR5. The processing region ARD corresponds to a partial region in the second direction D2 orthogonal to the first direction D1 in each of the first region AR1 to the fifth region AR5. The area of the processing region ARD is, for example, a predetermined ratio of the area of the region AR. The predetermined ratio is, for example, 80%.

In the present embodiment, a case where the predetermined ratio is 80% will be described, but the embodiment of the present invention is not limited thereto. The larger the predetermined ratio, the more accurate the statistical processing information can be generated. As the predetermined ratio is smaller, the processing load of the statistical processing section 142 can be reduced. The predetermined ratio is preferably 50% to 90%.

In the present embodiment, a case where the two-dimensional image sensor of the X-ray detector 13 includes five blocks will be described, but the embodiment of the present invention is not limited thereto. The two-dimensional image sensor of the X-ray detector 13 is only required to include a plurality of blocks. The area of the region AR can be made larger as the number of the plurality of blocks is larger.

4. Specific Examples of Deterioration Determination Method

Next, specific examples of a deterioration determination method for the X-ray detector 13 will be described with reference to FIGS. 4 to 9.

[4-1. First Deterioration Determination Method]

Figure 4:
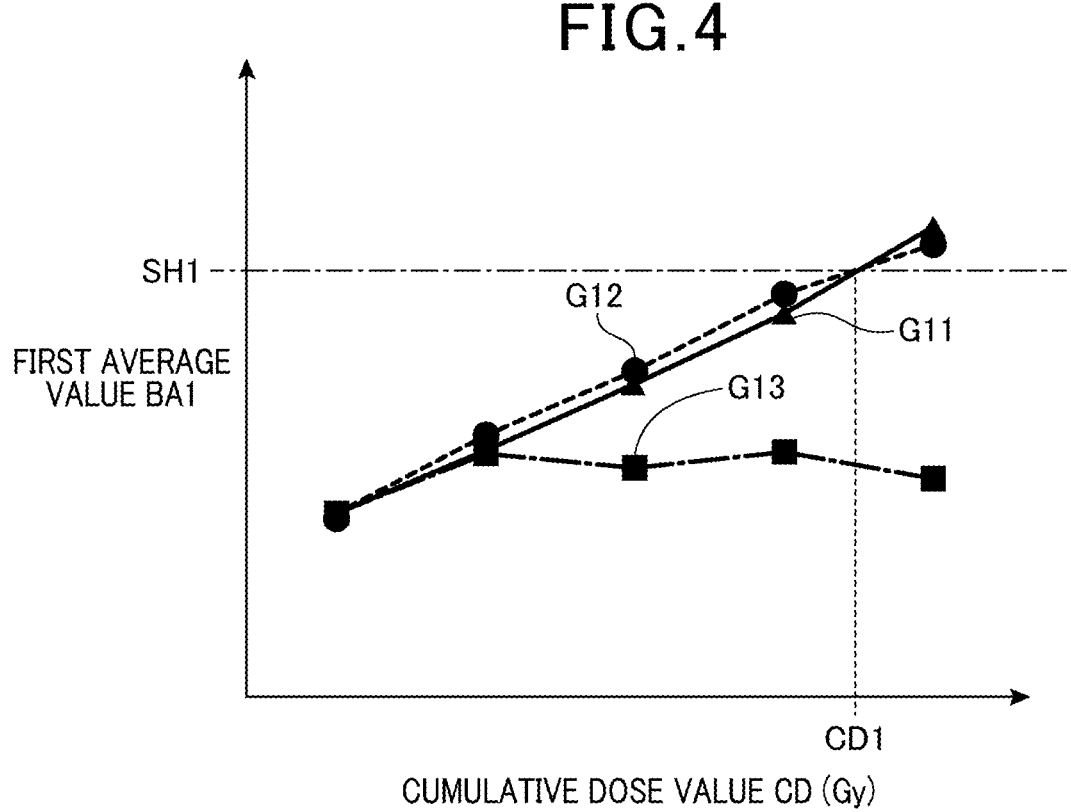
FIG. 4 is a graph showing a first deterioration determination method in which the determination is made by a determination section.

FIG. 4 is a graph showing a first deterioration determination method in which the determination is made by the determination section 143.

In FIG. 4, the horizontal axis represents a cumulative dose value CD, and the vertical axis represents the first average value BA1. The cumulative dose value CD is a value of accumulated dose of the X-rays with which the X-ray detector 13 is irradiated. The first average value BA1 indicates an average value of the luminance of the first captured image P1.

A graph G11 indicates a relationship between the first average value BA1 and the cumulative dose value CD in a first detector 13A. A graph G12 indicates a relationship between the first average value BA1 and the cumulative dose value CD in a second detector 13B. A graph G13 indicates a relationship between the first average value BA1 and the cumulative dose value CD in a third detector 13C.

Each of the first detector 13A, the second detector 13B, and the third detector 13C is an example of the X-ray detector 13, and has substantially the same configuration.

When the first average value BA1 is equal to or larger than a first threshold value SH1, the determination section 143 determines that the X-ray detector 13 has been deteriorated.

The first captured image P1 indicates the captured image P generated by the X-ray detector 13 in a state where the X-ray source 11 is turned off, and the first average value BA1 indicates the average value of the luminance of the first captured image P1.

Therefore, the first average value BA1 indicates an average value of the noise of the luminance detected by the X-ray detector 13. Therefore, when the first average value BA1 is equal to or larger than the first threshold value SH1, the determination section 143 determines that the X-ray detector 13 has been deteriorated.

As indicated by the graphs G11 and G12 of FIG. 4, the first average value BA1 of each of the first detector 13A and the second detector 13B becomes equal to or larger than the first threshold value SH1 when the cumulative dose value CD is equal to or larger than a first cumulative dose value CD1. That is, when the cumulative dose value CD is equal to or larger than the first cumulative dose value CD1, the determination section 143 determines that each of the first detector 13A and the second detector 13B has been deteriorated.

As described with reference to FIG. 4, when the first average value BA1 is equal to or larger than the first threshold value SH1, the determination section 143 determines that the X-ray detector 13 has been deteriorated. Therefore, the determination section 143 can determine that the X-ray detector 13 has been deteriorated when the average value of the noise of the luminance detected by the X-ray detector 13 is equal to or larger than the first threshold value SH1. Therefore, the determination section 143 can appropriately determine whether or not the X-ray detector 13 has been deteriorated.

[4-2. Second Deterioration Determination Method]

Figure 5:
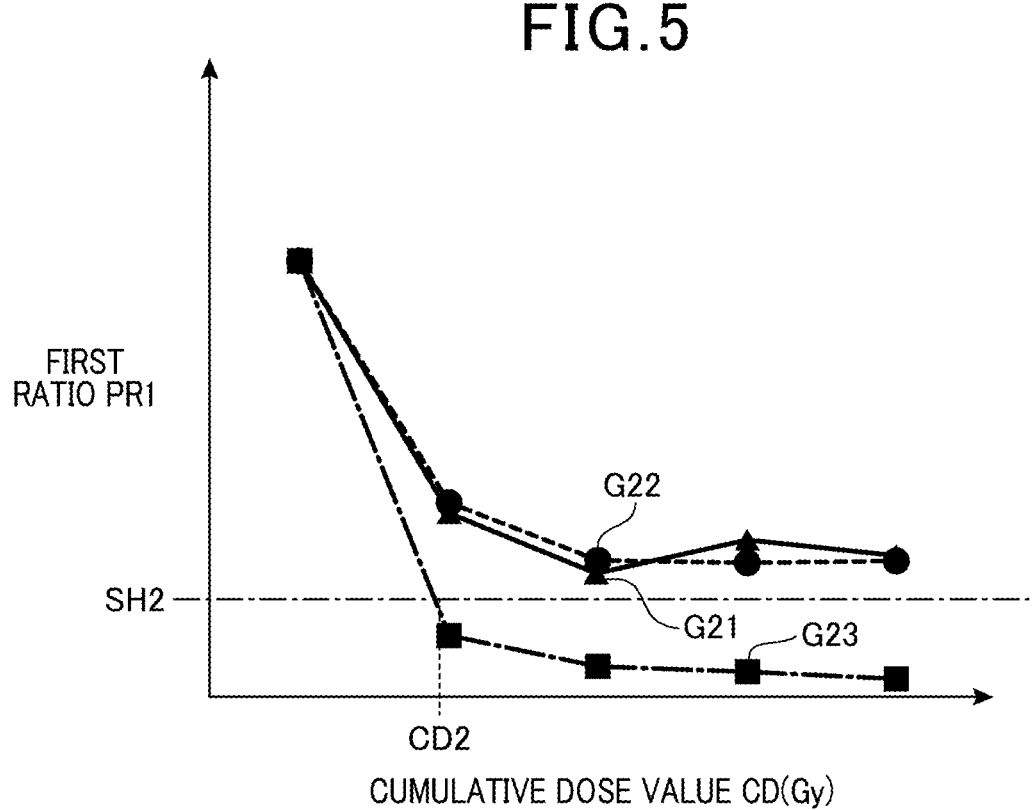
FIG. 5 is a graph showing a second deterioration determination method in which the determination is made by the determination section.

FIG. 5 is a graph showing a second deterioration determination method in which the determination is made by the determination section 143.

In FIG. 5, the horizontal axis represents the cumulative dose value CD, and the vertical axis represents the first ratio PR1. The cumulative dose value CD is a value of accumulated dose of the X-rays with which the X-ray detector 13 is irradiated. The first ratio PR1 indicates a ratio of the first average value BA1 in the state where the X-ray detector 13 is exposed to the first average value BA1 when the X-ray detector 13 is in the initial state. The first average value BA1 indicates an average value of the luminance of the first captured image P1.

A graph G21 indicates a relationship between the first ratio PR1 and the cumulative dose value CD in the first detector 13A. A graph G22 indicates a relationship between the first ratio PR1 and the cumulative dose value CD in the second detector 13B. A graph G23 indicates a relationship between the first ratio PR1 and the cumulative dose value CD in the third detector 13C.

The determination section 143 determines that the X-ray detector 13 has been deteriorated when the first ratio PR1 is equal to or smaller than a second threshold value SH2.

The first captured image P1 indicates the captured image P generated by the X-ray detector 13 in a state where the X-ray source 11 is turned off, and the first average value BA1 indicates the average value of the luminance of the first captured image P1.

Therefore, the first ratio PR1 indicates a decrease in the sensitivity of the X-ray detector 13 due to the exposure of the X-ray detector 13. Therefore, the determination section 143 determines that the X-ray detector 13 has been deteriorated when the first ratio PR1 is equal to or smaller than the second threshold value SH2.

As indicated by the graph G23 in FIG. 5, the first ratio PR1 of the third detector 13C is equal to or smaller than the second threshold value SH2 when the cumulative dose value CD is equal to or larger than a second cumulative dose value CD2. That is, the determination section 143 determines that the third detector 13C has been deteriorated when the cumulative dose value CD is equal to or larger than the second cumulative dose value CD2.

As described with reference to FIG. 5, the determination section 143 determines that the X-ray detector 13 has been deteriorated when the first ratio PR1 is equal to or smaller than the second threshold value SH2. Therefore, the determination section 143 can determine that the X-ray detector 13 has been deteriorated when the sensitivity of the X-ray detector 13 is equal to or smaller than the second threshold value SH2 of the initial value. Therefore, the determination section 143 can appropriately determine whether or not the X-ray detector 13 has been deteriorated.

[4-3. Third Deterioration Determination Method]

Figure 6:
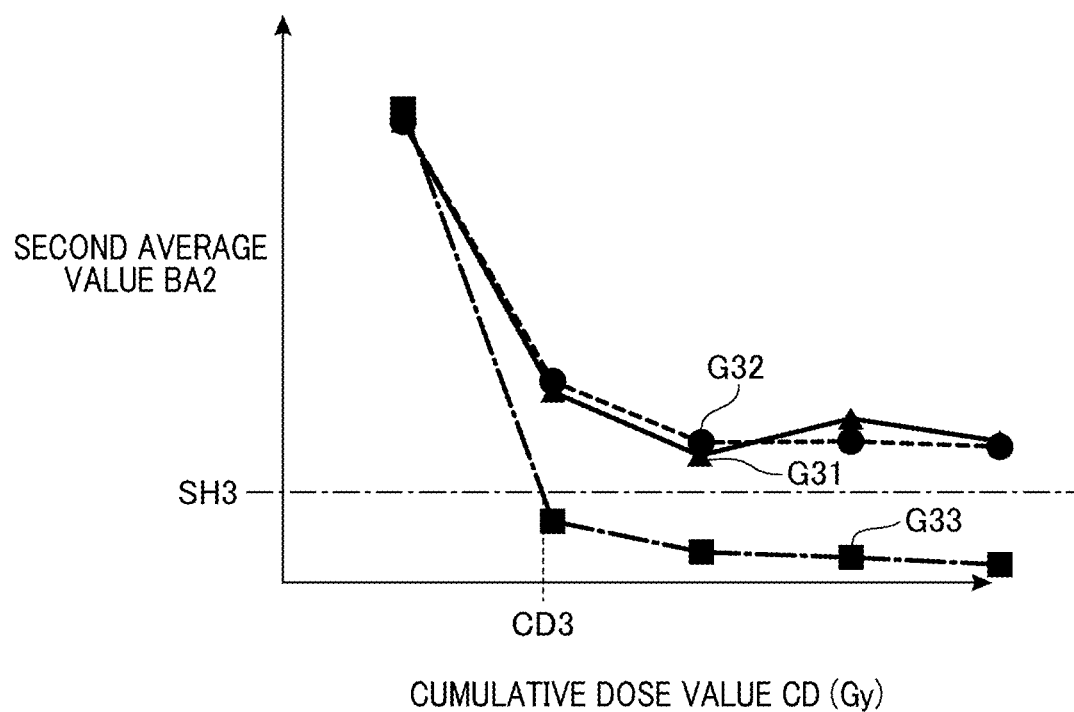
FIG. 6 is a graph showing a third deterioration determination method in which the determination is made by the determination section.

FIG. 6 is a graph showing a third deterioration determination method in which the determination is made by the determination section 143.

In FIG. 6, the horizontal axis represents the cumulative dose value CD, and the vertical axis represents the second average value BA2. The cumulative dose value CD is a value of accumulated dose of the X-rays with which the X-ray detector 13 is irradiated. The second average value BA2 indicates an average value of the luminance of the second captured image P2.

A graph G31 indicates a relationship between the second average value BA2 and the cumulative dose value CD in the first detector 13A. A graph G32 indicates a relationship between the second average value BA2 and the cumulative dose value CD in the second detector 13B. A graph G33 indicates a relationship between the second average value BA2 and the cumulative dose value CD in the third detector 13C.

When the second average value BA2 is equal to or smaller than the third threshold value SH3, the determination section 143 determines that the X-ray detector 13 has been deteriorated.

The second captured image P2 indicates the captured image P generated by the X-ray detector 13 in a state where the X-ray source 11 is turned on and the subject BJ is not placed on the stage 12, and the second average value BA2 indicates the average value of the luminance of the second captured image P2.

Therefore, the second average value BA2 indicates the sensitivity of the X-ray detector 13. Therefore, the determination section 143 determines that the X-ray detector 13 has been deteriorated when the second average value BA2 is equal to or smaller than the third threshold value SH3.

As indicated by the graph G33 in FIG. 6, the second average value BA2 of the third detector 13C is equal to or smaller than the third threshold value SH3 when the cumulative dose value CD is equal to or larger than a third cumulative dose value CD3. That is, the determination section 143 determines that the third detector 13C has been deteriorated when the cumulative dose value CD is equal to or larger than the third cumulative dose value CD3.

As described with reference to FIG. 6, the determination section 143 determines that the X-ray detector 13 has been deteriorated when the second average value BA2 is equal to or smaller than the third threshold value SH3. Therefore, the determination section 143 can determine that the X-ray detector 13 has been deteriorated when the sensitivity of the X-ray detector 13 is equal to or smaller than the third threshold value SH3. Therefore, the determination section 143 can appropriately determine whether or not the X-ray detector 13 has been deteriorated.

[4-4. Fourth Deterioration Determination Method]

Figure 7:
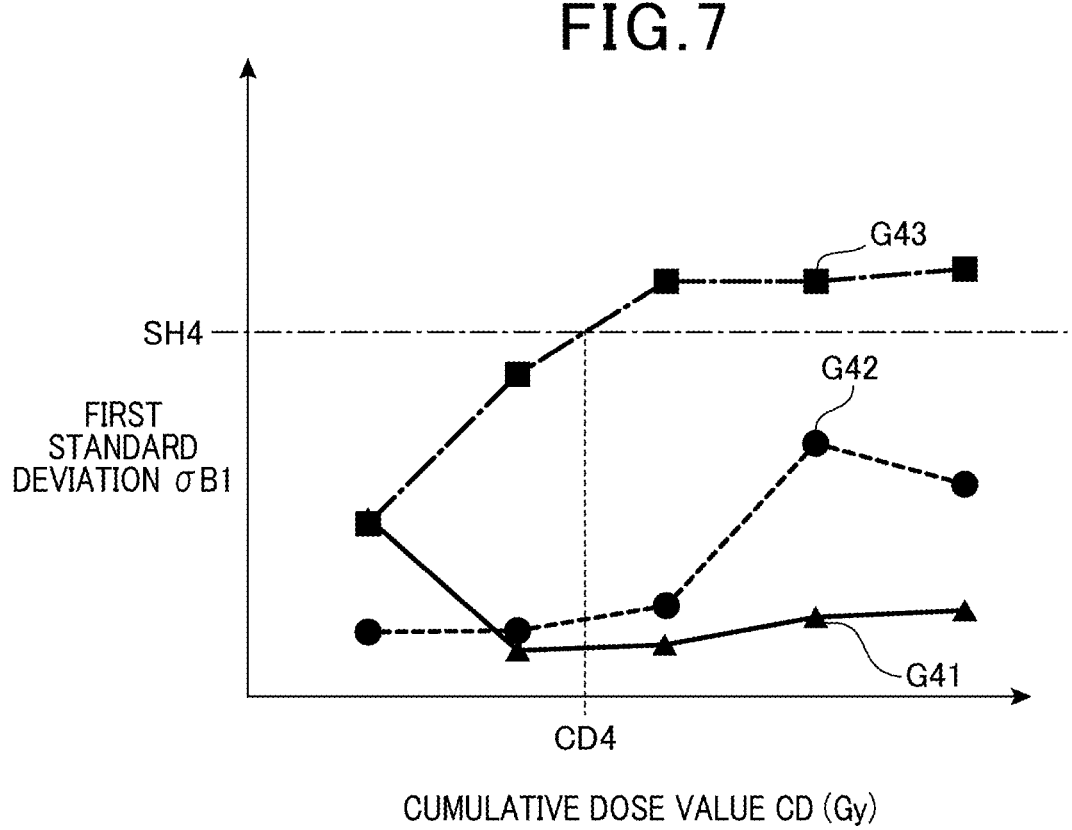
FIG. 7 is a graph showing a fourth deterioration determination method in which the determination is made by the determination section.

FIG. 7 is a graph showing a fourth deterioration determination method in which the determination is made by the determination section 143.

In FIG. 7, the horizontal axis represents the cumulative dose value CD, and the vertical axis represents the first standard deviation σB1. The cumulative dose value CD is a value of accumulated dose of the X-rays with which the X-ray detector 13 is irradiated. The first standard deviation σB1 indicates the standard deviation of the luminance of the first captured image P1.

A graph G41 indicates a relationship between the first standard deviation σB1 and the cumulative dose value CD in the first detector 13A. A graph G42 indicates a relationship between the first standard deviation σB1 and the cumulative dose value CD in the second detector 13B. A graph G43 indicates a relationship between the first standard deviation σB1 and the cumulative dose value CD in the third detector 13C.

The determination section 143 determines that the X-ray detector 13 has been deteriorated when the first standard deviation σB1 is equal to or larger than a fourth threshold value SH4.

The first captured image P1 indicates the captured image P generated by the X-ray detector 13 in a state where the X-ray source 11 is turned off, and the first standard deviation σB1 indicates the standard deviation of the luminance of the first captured image P1.

Therefore, the first standard deviation σB1 indicates the magnitude of the noise of the X-ray detector 13 when the X-ray source 11 is turned off. Therefore, the determination section 143 determines that the X-ray detector 13 has been deteriorated when the first standard deviation σB1 is equal to or larger than the fourth threshold value SH4.

As indicated by the graph G43 in FIG. 7, the first standard deviation σB1 of the third detector 13C is equal to or larger than the fourth threshold value SH4 when the cumulative dose value CD is equal to or larger than a fourth cumulative dose value CD4. That is, the determination section 143 determines that the third detector 13C has been deteriorated when the cumulative dose value CD is equal to or larger than the fourth cumulative dose value CD4.

As described with reference to FIG. 7, the determination section 143 determines that the X-ray detector 13 has been deteriorated when the first standard deviation σB1 is equal to or larger than the fourth threshold value SH4. Therefore, the determination section 143 can determine that the X-ray detector 13 has been deteriorated when the noise of the X-ray detector 13 when the X-ray source 11 is turned off is equal to or larger than the fourth threshold value SH4. Therefore, the determination section 143 can appropriately determine whether or not the X-ray detector 13 has been deteriorated.

[4-5. Fifth Deterioration Determination Method]

Figure 8:
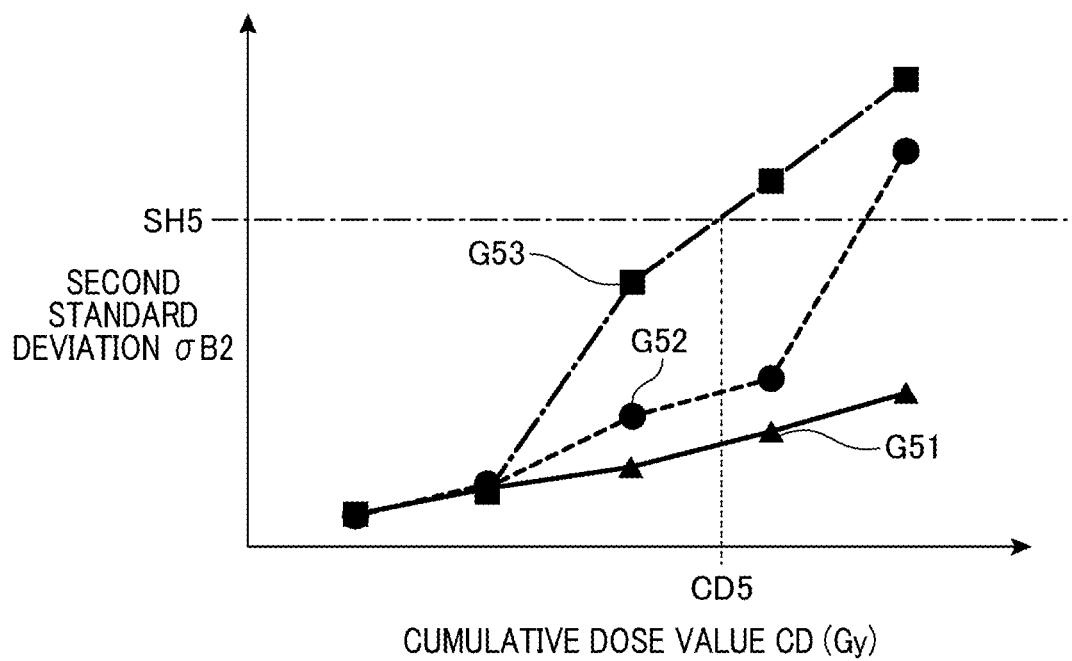
FIG. 8 is a graph showing a fifth deterioration determination method in which the determination is made by the determination section.

FIG. 8 is a graph showing a fifth deterioration determination method in which the determination is made by the determination section 143.

In FIG. 8, the horizontal axis represents the cumulative dose value CD, and the vertical axis represents the second standard deviation σB2. The cumulative dose value CD is a value of accumulated dose of the X-rays with which the X-ray detector 13 is irradiated. The second standard deviation σB2 indicates the standard deviation of the luminance of the second captured image P2.

A graph G51 indicates a relationship between the second standard deviation σB2 and the cumulative dose value CD in the first detector 13A. A graph G52 indicates a relationship between the second standard deviation σB2 and the cumulative dose value CD in the second detector 13B. A graph G53 indicates a relationship between the second standard deviation σB2 and the cumulative dose value CD in the third detector 13C.

The determination section 143 determines that the X-ray detector 13 has been deteriorated when the second standard deviation σB2 is equal to or larger than a fifth threshold value SH5.

The second captured image P2 indicates the captured image P generated by the X-ray detector 13 in a state where the X-ray source 11 is turned on and the subject BJ is not placed on the stage 12, and the second standard deviation σB2 indicates the standard deviation of the luminance of the second captured image P2.

Therefore, the second standard deviation σB2 indicates the magnitude of the noise of the X-ray detector 13 when the X-ray source 11 is turned on. Therefore, the determination section 143 determines that the X-ray detector 13 has been deteriorated when the second standard deviation σB2 is equal to or larger than the fifth threshold value SH5.

As indicated by the graph G53 in FIG. 8, the second standard deviation σB2 of the third detector 13C is equal to or larger than the fifth threshold value SH5 when the cumulative dose value CD is equal to or larger than a fifth cumulative dose value CD5. That is, the determination section 143 determines that the third detector 13C has been deteriorated when the cumulative dose value CD is equal to or larger than the fifth cumulative dose value CD5.

As described with reference to FIG. 8, the determination section 143 determines that the X-ray detector 13 has been deteriorated when the second standard deviation σB2 is equal to or larger than the fifth threshold value SH5. Therefore, the determination section 143 can determine that the X-ray detector 13 has been deteriorated when the noise of the X-ray detector 13 when the X-ray source 11 is turned on is equal to or larger than the fifth threshold value SH5. Therefore, the determination section 143 can appropriately determine whether or not the X-ray detector 13 has been deteriorated.

[4-6. Sixth Deterioration Determination Method]

Figure 9:
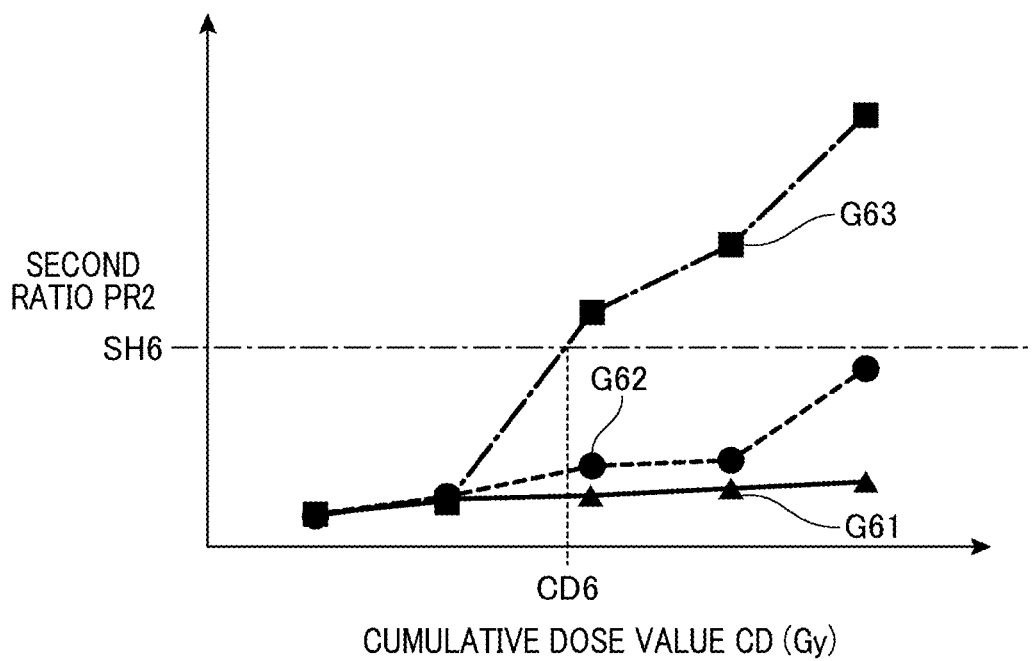
FIG. 9 is a graph showing a sixth deterioration determination method in which the determination is made by the determination section.

FIG. 9 is a graph showing a sixth deterioration determination method in which the determination is made by the determination section 143.

In FIG. 9, the horizontal axis represents the cumulative dose value CD, and the vertical axis represents the second ratio PR2. The cumulative dose value CD is a value of accumulated dose of the X-rays with which the X-ray detector 13 is irradiated. The second ratio PR2 indicates a ratio of the first standard deviation σB1 to the first average value BA1.

A graph G61 indicates a relationship between the second ratio PR2 and the cumulative dose value CD in the first detector 13A. A graph G62 indicates a relationship between the second ratio PR2 and the cumulative dose value CD in the second detector 13B. A graph G63 indicates a relationship between the second ratio PR2 and the cumulative dose value CD in the third detector 13C.

The determination section 143 determines that the X-ray detector 13 has been deteriorated when the second ratio PR2 is equal to or larger than a sixth threshold value SH6.

The first captured image P1 indicates the captured image P generated by the X-ray detector 13 in a state where the X-ray source 11 is turned off, the first standard deviation σB1 indicates the standard deviation of the luminance of the first captured image P1, and the first average value BA1 indicates the average value of the luminance of the first captured image P1.

Therefore, the second ratio PR2 indicates the ratio of the noise to the detection luminance value of the X-ray detector 13 when the X-ray source 11 is turned off. Therefore, the determination section 143 determines that the X-ray detector 13 has been deteriorated when the second ratio PR2 is equal to or larger than the sixth threshold value SH6.

As indicated by the graph G63 in FIG. 9, the second ratio PR2 of the third detector 13C is equal to or larger than the sixth threshold value SH6 when the cumulative dose value CD is equal to or larger than the sixth cumulative dose value CD6. That is, the determination section 143 determines that the third detector 13C has been deteriorated when the cumulative dose value CD is equal to or larger than the sixth cumulative dose value CD6.

As described with reference to FIG. 9, the determination section 143 determines that the X-ray detector 13 has been deteriorated when the second ratio PR2 is equal to or larger than the sixth threshold value SH6. Therefore, the determination section 143 can determine that the X-ray detector 13 has been deteriorated when the ratio of the noise to the detected luminance value of the X-ray detector 13 when the X-ray source 11 is turned off is equal to or larger than the sixth threshold value SH6. Therefore, the determination section 143 can appropriately determine whether or not the X-ray detector 13 has been deteriorated.

Each of the first threshold value SH1 to the sixth threshold value SH6 described with reference to FIGS. 4 to 9 is set in advance by an experiment or the like.

In addition, although a case where the statistical processing information is the first average value BA1, the first standard deviation σB1, the second average value BA2, and the second standard deviation σB2 has been described in FIGS. 4 to 9, the embodiment of the present invention is not limited thereto. The statistical processing information is only required to be generated by performing statistical processing on at least one of the first captured image P1 and the second captured image P2. For example, the statistical processing information may be a mode value of the luminance of at least one of the first captured image P1 and the second captured image P2, or may be a median value of the luminance of at least one of the first captured image P1 and the second captured image P2.

5. Processing of Deterioration Determination Device

Figure 10:
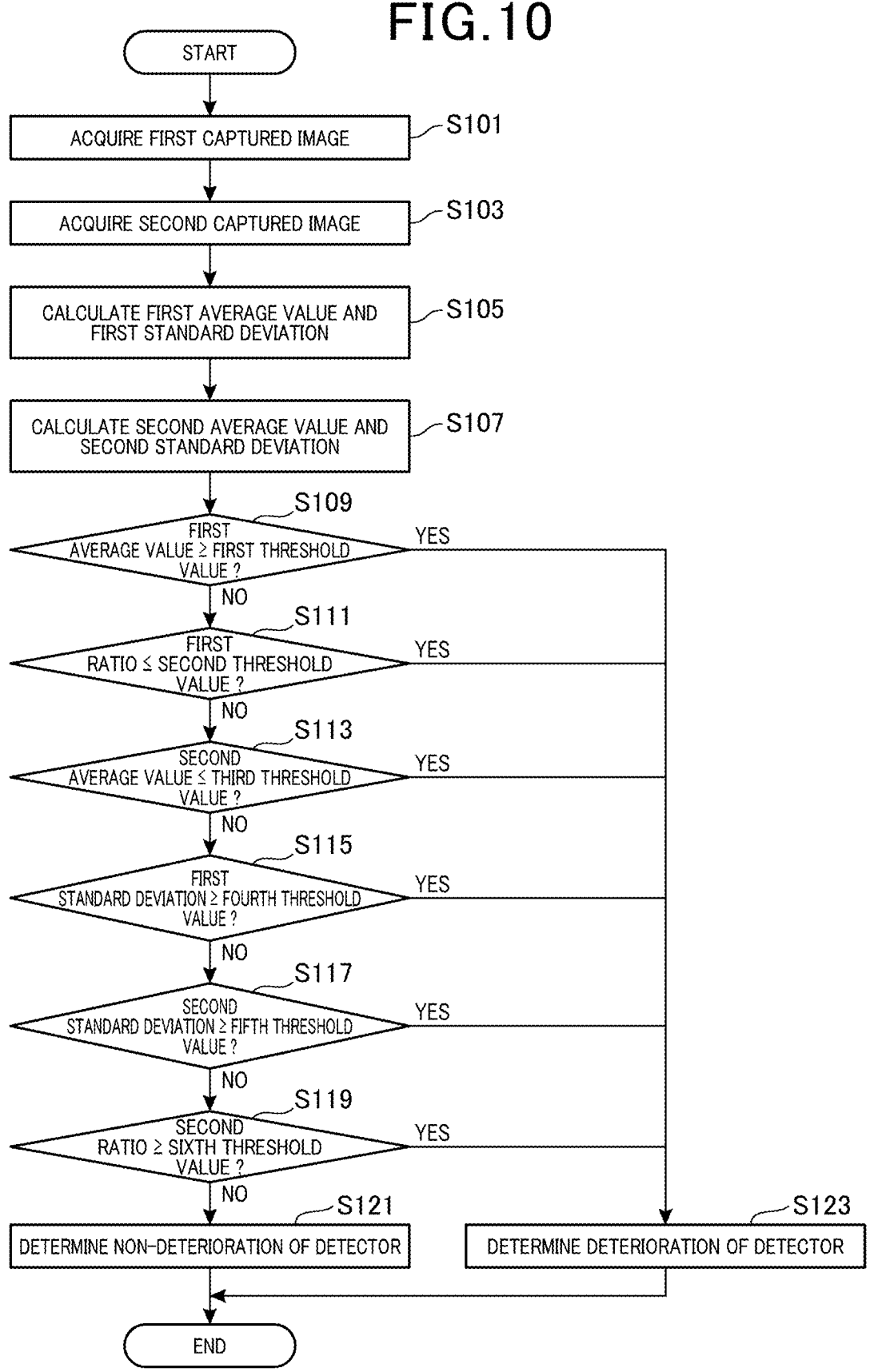
FIG. 10 is a flowchart illustrating an example of processing of the deterioration determination device.

FIG. 10 is a flowchart illustrating an example of processing of the deterioration determination device 14.

As illustrated in FIG. 10, first, in Step S101, the acquisition section 141 acquires the first captured image P1.

Next, in Step S103, the acquisition section 141 acquires the second captured image P2.

Next, in Step S105, the statistical processing section 142 calculates the first average value BA1 and the first standard deviation σB1.

Next, in Step S107, the statistical processing section 142 calculates the second average value BA2 and the second standard deviation σB2.

Next, in Step S109, the determination section 143 determines whether or not the first average value BA1 is equal to or larger than the first threshold value SH1.

When the determination section 143 determines that the first average value BA1 is equal to or larger than the first threshold value SH1 (Step S109; YES), the processing proceeds to Step S123. When the determination section 143 determines that the first average value BA1 is not equal to or larger than the first threshold value SH1 (Step S109; NO), the processing proceeds to Step S111.

Then, in Step S111, the determination section 143 determines whether or not the first ratio PR1 is equal to or smaller than the second threshold value SH2.

When the determination section 143 determines that the first ratio PR1 is equal to or smaller than the second threshold value SH2 (Step S111; YES), the processing proceeds to Step S123. When the determination section 143 determines that the first ratio PR1 is not equal to or smaller than the second threshold value SH2 (Step S111; NO), the processing proceeds to Step S113.

Then, in Step S113, the determination section 143 determines whether or not the second average value BA2 is equal to or smaller than the third threshold value SH3.

When the determination section 143 determines that the second average value BA2 is equal to or smaller than the third threshold value SH3 (Step S113; YES), the processing proceeds to Step S123. When the determination section 143 determines that the second average value BA2 is not equal to or smaller than the third threshold value SH3 (Step S113; NO), the processing proceeds to Step S115.

Then, in Step S115, the determination section 143 determines whether or not the first standard deviation σB1 is equal to or larger than the fourth threshold value SH4.

When the determination section 143 determines that the first standard deviation σB1 is equal to or larger than the fourth threshold value SH4 (Step S115; YES), the processing proceeds to Step S123. When the determination section 143 determines that the first standard deviation σB1 is not equal to or larger than the fourth threshold value SH4 (Step S115; NO), the processing proceeds to Step S117.

Then, in Step S117, the determination section 143 determines whether or not the second standard deviation σB2 is equal to or larger than the fifth threshold value SH5.

When the determination section 143 determines that the second standard deviation σB2 is equal to or larger than the fifth threshold value SH5 (Step S117; YES), the processing proceeds to Step S123. When the determination section 143 determines that the second standard deviation σB2 is not equal to or larger than the fifth threshold value SH5 (Step S117; NO), the processing proceeds to Step S119.

Then, in Step S119, the determination section 143 determines whether or not the second ratio PR2 is equal to or larger than the sixth threshold value SH6.

When the determination section 143 determines that the second ratio PR2 is not equal to or larger than the sixth threshold value SH6 (Step S119; NO), the processing proceeds to Step S121.

Then, in Step S121, the determination section 143 determines that the X-ray detector 13 does not deteriorate, and thereafter, the processing ends.

When the determination section 143 determines that the second ratio PR2 is equal to or larger than the sixth threshold value SH6 (Step S119; YES), the processing proceeds to Step S123.

Then, in Step S123, the determination section 143 determines that the X-ray detector 13 has been deteriorated, and thereafter, the processing ends.

Steps S101 and S103 correspond to an example of an "acquisition step". Steps S105 and S107 correspond to an example of a "statistical processing step". Steps S109 to S123 correspond to an example of a "determination step".

In FIG. 10, the acquisition section 141 acquires the first captured image P1 and the second captured image P2, but the present invention is not limited thereto. The acquisition section 141 is only required to acquire at least one of the first captured image P1 and the second captured image P2. For example, it is acceptable that the acquisition section 141 acquires the first captured image P1 and does not acquire the second captured image P2. Furthermore, for example, it is also acceptable that the acquisition section 141 acquires the second captured image P2 and does not acquire the first captured image P1.

In addition, in FIG. 10, although a case where the statistical processing section 142 calculates the first average value BA1 and the first standard deviation σB1, and the second average value BA2 and the second standard deviation σB2 is described, the present invention is not limited thereto. The statistical processing section 142 is only required to calculate at least one of the first average value BA1 and the first standard deviation σB1, and the second average value BA2 and the second standard deviation σB2.

6. Embodiments and Effects

It is understood, by those skilled in the art, that the above-described embodiment is a specific example of the following aspects.

(Item 1)

According to an aspect, there is provided a deterioration determination method in a deterioration determination device configured to determine deterioration of an X-ray detector of an industrial X-ray imaging apparatus, the deterioration determination method including: an acquisition step of acquiring a captured image generated by the X-ray detector; a statistical processing step of generating statistical processing information of the captured image; and a determination step of determining whether or not the X-ray detector has been deteriorated, based on the statistical processing information.

According to the deterioration determination method described in Item 1, whether or not the X-ray detector has been deteriorated is determined based on the statistical processing information of the captured image.

Therefore, by setting appropriate statistical processing information as the statistical processing information, it is possible to appropriately determine whether or not the X-ray detector has been deteriorated.

(Item 2)

In the deterioration determination method described in Item 1, the industrial X-ray imaging apparatus includes an X-ray source, and a stage which is disposed between the X-ray source and the X-ray detector and on which an imaging object is placed, and the captured image includes at least one of a first captured image generated by the X-ray detector in a state where the X-ray source is turned off, and a second captured image generated by the X-ray detector in a state where the X-ray source is turned on and the imaging object is not placed on the stage.

According to the deterioration determination method described in Item 2, the captured image includes at least one of the first captured image generated by the X-ray detector in the state where the X-ray source is turned off, and the second captured image generated by the X-ray detector in the state where the X-ray source is turned on and the imaging object is not placed on the stage.

Therefore, whether or not the X-ray detector has been deteriorated can be determined based on the statistical processing information of the first captured image and/or the statistical processing information of the second captured image. Therefore, it is possible to appropriately determine whether or not the X-ray detector has been deteriorated.

(Item 3)

In the deterioration determination method described in Item 2, the statistical processing information includes at least one of an average value of luminance of the first captured image, a standard deviation of luminance of the first captured image, an average value of luminance of the second captured image, and a standard deviation of luminance of the second captured image.

According to the deterioration determination method described in Item 3, the statistical processing information includes at least one of the average value of luminance of the first captured image, the standard deviation of luminance of the first captured image, the average value of luminance of the second captured image, and the standard deviation of luminance of the second captured image.

Therefore, whether or not the X-ray detector has been deteriorated can be determined based on at least one of the average value of luminance of the first captured image, the standard deviation of luminance of the first captured image, the average value of luminance of the second captured image, and the standard deviation of luminance of the second captured image. Therefore, it is possible to appropriately determine whether or not the X-ray detector has been deteriorated.

(Item 4)

In the deterioration determination method described in Item 2 or 3, the statistical processing information is an average value of luminance of the first captured image, and, in the determination step, it is determined that the X-ray detector has been deteriorated when the average value is equal to or larger than a first threshold value.

According to the deterioration determination method described in Item 4, it is determined that the X-ray detector has been deteriorated when the average value of luminance of the first captured image is equal to or larger than the first threshold value.

Therefore, it can be determined that the X-ray detector has been deteriorated when the average value of the noise of the luminance detected by the X-ray detector is equal to or larger than the first threshold value. Therefore, it is possible to appropriately determine whether or not the X-ray detector has been deteriorated, by appropriately setting the first threshold value.

(Item 5)

In the deterioration determination method described in any one of Items 2 to 4, the statistical processing information is a first ratio indicating a ratio of an average value of luminance of the first captured image in a state where the X-ray detector is exposed to an average value of luminance of the first captured image when the X-ray detector is in an initial state, and, in the determination step, it is determined that the X-ray detector has been deteriorated when the first ratio is equal to or smaller than a second threshold value.

According to the deterioration determination method described in Item 5, it is determined that the X-ray detector has been deteriorated when the first ratio is equal to or smaller than the second threshold value.

Therefore, it can be determined that the X-ray detector has been deteriorated when the sensitivity of the X-ray detector is equal to or smaller than the second threshold value of the initial value. Therefore, it is possible to appropriately determine whether or not the X-ray detector has been deteriorated, by appropriately setting the second threshold value.

(Item 6)

In the deterioration determination method described in any one of Items 2 to 5, the statistical processing information is an average value of luminance of the second captured image, and, in the determination step, it is determined that the X-ray detector has been deteriorated when the average value is equal to or smaller than a third threshold value.

According to the deterioration determination method described in Item 6, it is determined that the X-ray detector has been deteriorated when the average value of luminance of the second captured image is equal to or smaller than the third threshold value.

Therefore, it can be determined that the X-ray detector has been deteriorated when the sensitivity of the X-ray detector is equal to or smaller than the third threshold value. Therefore, it is possible to appropriately determine whether or not the X-ray detector has been deteriorated, by appropriately setting the third threshold value.

(Item 7)

In the deterioration determination method described in any one of Items 2 to 6, the statistical processing information is a standard deviation of luminance of the first captured image, and, in the determination step, it is determined that the X-ray detector has been deteriorated when the standard deviation is equal to or larger than a fourth threshold value.

According to the deterioration determination method described in Item 7, it is determined that the X-ray detector has been deteriorated when the standard deviation of luminance of the first captured image is equal to or larger than the fourth threshold value.

Therefore, it can be determined that the X-ray detector has been deteriorated when the noise of the X-ray detector when the X-ray source is turned off is equal to or larger than the fourth threshold value. Therefore, it is possible to appropriately determine whether or not the X-ray detector has been deteriorated, by appropriately setting the fourth threshold value.

(Item 8)

In the deterioration determination method described in any one of Items 2 to 7, the statistical processing information is a standard deviation of luminance of the second captured image, and, in the determination step, it is determined that the X-ray detector has been deteriorated when the standard deviation is equal to or larger than a fifth threshold value.

According to the deterioration determination method described in Item 8, it is determined that the X-ray detector has been deteriorated when the standard deviation of luminance of the second captured image is equal to or larger than the fifth threshold value.

Therefore, it can be determined that the X-ray detector has been deteriorated when the noise of the X-ray detector when the X-ray source is turned on is equal to or larger than the fifth threshold value. Therefore, it is possible to appropriately determine whether or not the X-ray detector has been deteriorated, by appropriately setting the fifth threshold value.

(Item 9)

In the deterioration determination method described in any one of Items 2 to 8, the statistical processing information is a second ratio indicating a ratio of a standard deviation of luminance of the first captured image to an average value of the luminance of the first captured image, and, in the determination step, it is determined that the X-ray detector has been deteriorated when the second ratio is equal to or larger than a sixth threshold value threshold value.

According to the deterioration determination method described in Item 9, it is determined that the X-ray detector has been deteriorated when the second ratio is equal to or larger than the sixth threshold value.

Therefore, it can be determined that the X-ray detector has been deteriorated when the ratio of the noise to the luminance detection value of the X-ray detector when the X-ray source is turned off is equal to or larger than the sixth threshold value. Therefore, it is possible to appropriately determine whether or not the X-ray detector has been deteriorated, by appropriately setting the sixth threshold value.

(Item 10)

In the deterioration determination method described in any one of Items 1 to 9, in the statistical processing step, statistical processing information of a part of the captured image is generated.

According to the deterioration determination method described in Item 10, the statistical processing information of a part of the captured image is generated.

Therefore, the processing amount in the statistical processing step can be reduced as compared with the case of generating the statistical processing information of the entire captured image.

(Item 11)

In the deterioration determination method described in Item 10, the captured image includes a plurality of regions arranged in a first direction of the captured image, the X-ray detector includes an image sensor corresponding to each of the plurality of regions, and the part of the image corresponds to a part of a region in a second direction orthogonal to the first direction in each of the plurality of regions.

According to the deterioration determination method described in Item 11, a part of the image corresponds to a part of the region in the second direction orthogonal to the first direction in each of the plurality of regions.

Therefore, the influence on the statistical processing information can be suppressed, and the processing amount in the statistical processing step can be reduced.

(Item 12)

According to another aspect, there is provided a deterioration determination device configured to determine deterioration of an X-ray detector of an industrial X-ray imaging apparatus, the deterioration determination device including: an acquisition section configured to acquire a captured image generated by the X-ray detector; a statistical processing section configured to generate statistical processing information of the captured image; and a determination section configured to determine whether or not the X-ray detector has been deteriorated, based on the statistical processing information.

According to the deterioration determination device described in Item 12, whether or not the X-ray detector has been deteriorated is determined based on the statistical processing information of the captured image.

Therefore, by setting appropriate statistical processing information as the statistical processing information, it is possible to appropriately determine whether or not the X-ray detector has been deteriorated.

7. Other Embodiments

The deterioration determination method and the deterioration determination device 14 according to the present embodiment are merely examples of aspects of the deterioration determination method and the deterioration determination device, and can be optionally modified and applied without departing from the gist of the present invention.

In the present embodiment, a case where the deterioration determination device 14 is configured as a part of the industrial X-ray imaging apparatus 1 will be described, but the embodiment of the present invention is not limited thereto. The deterioration determination device 14 may be configured separately from the industrial X-ray imaging apparatus 1.

In the present embodiment, although the case where the captured image P includes the first captured image P1 and the second captured image P2 has been described, the present invention is not limited thereto. The captured image P is only required to include at least one of the first captured image P1 and the second captured image P2. For example, it is acceptable that the captured image P includes the first captured image P1 and does not include the second captured image P2. In addition, for example, it is also acceptable that the captured image P includes the second captured image P2 and does not include the first captured image P1.

In the present embodiment, although the case where the statistical processing information includes the first average value BA1, the first standard deviation σB1, the second average value BA2, and the second standard deviation σB2 has been described, the present invention is not limited thereto. The statistical processing information is only required to include at least one of the first average value BA1, the first standard deviation σB1, the second average value BA2, and the second standard deviation σB2. For example, it is acceptable that the statistical processing information includes the first average value BA1 and does not include any of the first standard deviation σB1, the second average value BA2, and the second standard deviation σB2.

The deterioration determination device 14 may be configured as, for example, a server device communicably connected to the industrial X-ray imaging apparatus 1 via the Internet or the like. In this case, when the server device determines that the X-ray detector 13 has been deteriorated, the information indicating that the X-ray detector 13 has been deteriorated is preferably transmitted from the server device to, for example, a maintenance service person for the industrial X-ray imaging apparatus 1 or a smartphone owned by a maintenance company. In this case, the maintenance service person or the maintenance company can easily confirm that the X-ray detector 13 has been deteriorated. As a result, the deteriorated X-ray detector 13 can be replaced early. Therefore, the convenience of the industrial X-ray imaging apparatus 1 for the user can be improved.

Figure 2:
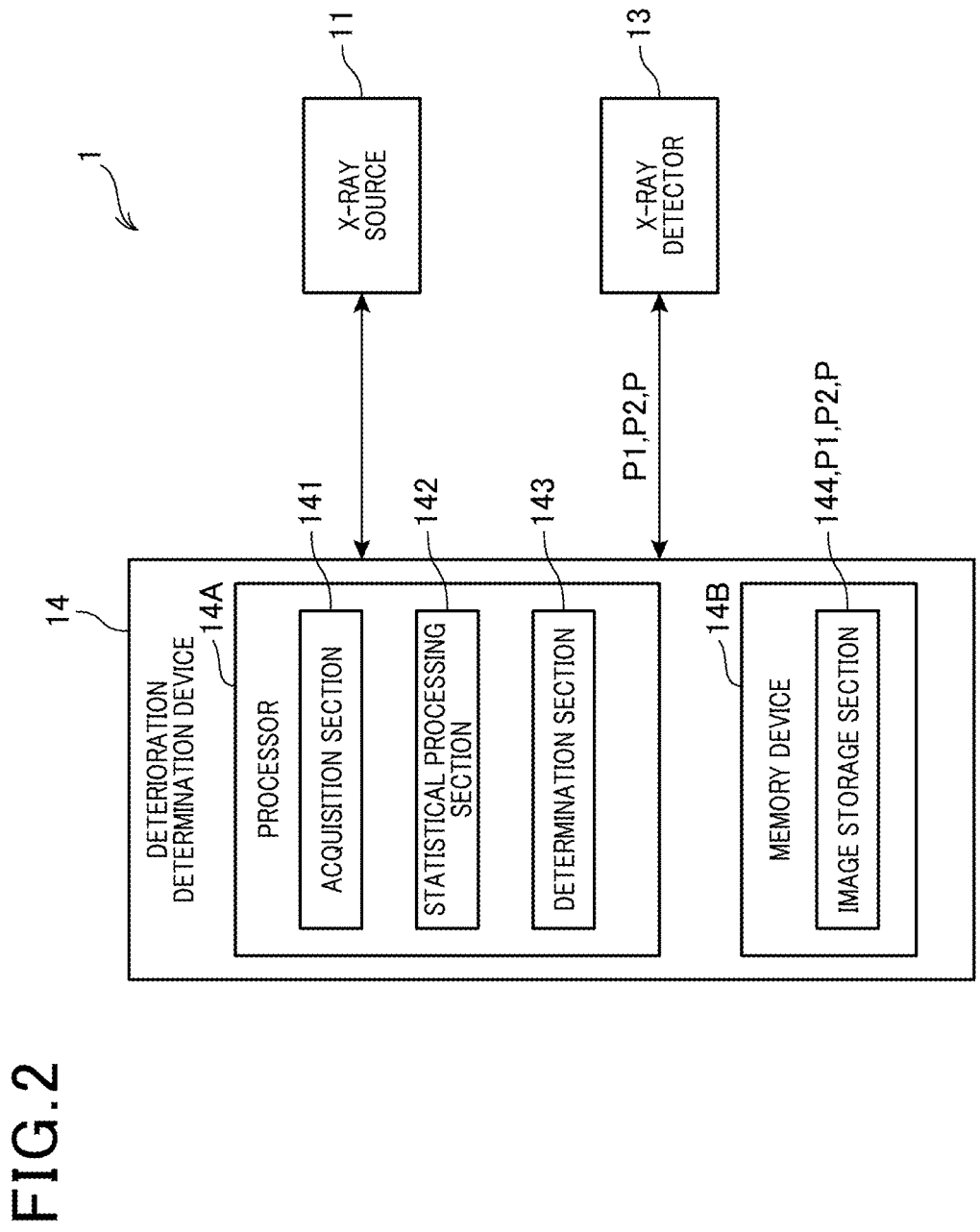
FIG. 2 is a diagram illustrating an example of a configuration of a deterioration determination device according to the present embodiment.

In addition, each functional unit illustrated in FIG. 2 indicates a functional configuration, and a specific implementation form is not particularly limited. That is, hardware individually corresponding to each functional unit does not necessarily need to be mounted, and it is of course possible to employ a configuration in which functions of a plurality of functional units are realized by one processor executing a program. In addition, some of the functions implemented by software in the above embodiment may be implemented by hardware, or some of the functions implemented by hardware may be implemented by software.

In addition, the processing unit of the flowchart illustrated in FIG. 10 is divided according to main processing contents in order to facilitate understanding of the processing of the deterioration determination device 14. There is no limitation in the way of dividing or in the name of the processing unit illustrated in the flowchart of FIG. 10, and the processing unit can be divided into more processing units according to the processing content. Alternatively, it is possible to divide the processing unit in a manner in which one processing unit includes more processing. In addition, the processing order in the above flowchart is not limited to the illustrated example.

The functional units of the deterioration determination device 14 can be implemented by causing the processor 14A included in the deterioration determination device 14 to execute the control program. The control program can also be recorded in a computer-readable recording medium. As the recording medium, a magnetic or optical recording medium or a semiconductor memory device can be used. Specific examples thereof include portable or fixed recording media such as a flexible disk, an HDD, a compact disk read only memory (CD-ROM), a DVD, a Blu-ray (registered trademark) disc, a magneto-optical disk, a flash memory, and a card-type recording medium. Furthermore, the recording medium may be a non-volatile storage device such as a RAM, a ROM, or an HDD which is an internal storage device included in the deterioration determination device 14. In addition, the control program may be stored in a server device or the like, and the control program may be downloaded from the server device to the deterioration determination device 14.

REFERENCE SIGNS LIST

1 X-ray imaging apparatus
11 X-ray source
12 Stage
13 X-ray detector
14 Deterioration determination device
14A Processor
14B Memory device
141 Acquisition section
142 Statistical processing section
143 Determination section
144 Image storage section
BA1 First average value
BA2 Second average value
BJ Subject (imaging object)
CD Cumulative dose value
D1 First direction
D2 Second direction
P Captured image
P1 First captured image
P2 Second captured image
PR1 First ratio
PR2 Second ratio
SH1 First threshold value
SH2 Second threshold value
SH3 Third threshold value
SH4 Fourth threshold value
SH5 Fifth threshold value
SH6 Sixth threshold value
σB1 First standard deviation
σB2 Second standard deviation

What is claimed is:

1. A deterioration determination method in a deterioration determination device configured to determine deterioration of an X-ray detector of an industrial X-ray imaging apparatus, the deterioration determination method comprising:
    an acquisition step of acquiring a captured image generated by the X-ray detector;
    a statistical processing step of generating statistical processing information of the captured image; and
    a determination step of determining whether or not the X-ray detector has been deteriorated, based on the statistical processing information,
    wherein the industrial X-ray imaging apparatus includes an X-ray source, and a stage which is disposed between the X-ray source and the X-ray detector and on which an imaging object is placed;
    wherein the captured image includes at least one of a first captured image generated by the X-ray detector in a state where the X-ray source is turned off, and a second captured image generated by the X-ray detector in a state where the X-ray source is turned on and the imaging object is not placed on the stage;
    wherein the statistical processing information is a first ratio indicating a ratio of an average value of luminance of the first captured image in a state where the X-ray detector is exposed to an average value of luminance of the first captured image when the X-ray detector is in an initial state; and
    wherein, in the determination step, it is determined that the X-ray detector has been deteriorated when the first ratio is equal to or smaller than a second threshold value.

2. The deterioration determination method according to claim 1, wherein the statistical processing information further includes at least one of the average value of luminance of the first captured image, a standard deviation of luminance of the first captured image, the average value luminance of the second captured image, and a standard deviation of luminance of the second captured image.

3. The deterioration determination method according to claim 1, wherein the statistical processing information further includes the average value of luminance of the first captured image; and
wherein, in the determination step, it is determined that the X-ray detector has been deteriorated when the average value of luminance of the first captured image is equal to or larger than a first threshold value.

4. The deterioration determination method according to claim 1, wherein the statistical processing information further includes the average value of luminance of the second captured image; and
wherein, in the determination step, it is determined that the X-ray detector has been deteriorated when the average value of luminance of the second captured image is equal to or smaller than a third threshold value.

5. A deterioration determination method in a deterioration determination device configured to determine deterioration of an X-ray detector of an industrial X-ray imaging apparatus, the deterioration determination method comprising:
an acquisition step of acquiring a captured image generated by the X-ray detector;
a statistical processing step of generating statistical processing information of the captured image; and
a determination step of determining whether or not the X-ray detector has been deteriorated, based on the statistical processing information,
wherein the industrial X-ray imaging apparatus includes an X-ray source, and a stage which is disposed between the X-ray source and the X-ray detector and on which an imaging object is placed;
wherein the captured image includes at least one of a first captured image generated by the X-ray detector in a state where the X-ray source is turned off, and a second captured image generated by the X-ray detector in a state where the X-ray source is turned on and the imaging object is not placed on the stage;
wherein the statistical processing information is a standard deviation of luminance of the first captured image; and
wherein, in the determination step, it is determined that the X-ray detector has been deteriorated when the standard deviation is equal to or larger than a fourth threshold value.

6. A deterioration determination method in a deterioration determination device configured to determine deterioration of an X-ray detector of an industrial X-ray imaging apparatus, the deterioration determination method comprising:
an acquisition step of acquiring a captured image generated by the X-ray detector;
a statistical processing step of generating statistical processing information of the captured image; and
a determination step of determining whether or not the X-ray detector has been deteriorated, based on the statistical processing information,
wherein the industrial X-ray imaging apparatus includes an X-ray source, and a stage which is disposed between the X-ray source and the X-ray detector and on which an imaging object is placed;
wherein the captured image includes at least one of a first captured image generated by the X-ray detector in a state where the X-ray source is turned off, and a second captured image generated by the X-ray detector in a state where the X-ray source is turned on and the imaging object is not placed on the stage;
wherein the statistical processing information is a standard deviation of luminance of the second captured image; and
wherein, in the determination step, it is determined that the X-ray detector has been deteriorated when the standard deviation is equal to or larger than a fifth threshold value.

7. A deterioration determination method in a deterioration determination device configured to determine deterioration of an X-ray detector of an industrial X-ray imaging apparatus, the deterioration determination method comprising:
an acquisition step of acquiring a captured image generated by the X-ray detector;
a statistical processing step of generating statistical processing information of the captured image; and
a determination step of determining whether or not the X-ray detector has been deteriorated, based on the statistical processing information,
wherein the industrial X-ray imaging apparatus includes an X-ray source, and a stage which is disposed between the X-ray source and the X-ray detector and on which an imaging object is placed;
wherein the captured image includes at least one of a first captured image generated by the X-ray detector in a state where the X-ray source is turned off, and a second captured image generated by the X-ray detector in a state where the X-ray source is turned on and the imaging object is not placed on the stage;
wherein the statistical processing information is a second ratio indicating a ratio of a standard deviation of luminance of the first captured image to an average value of the luminance of the first captured image; and
wherein, in the determination step, it is determined that the X-ray detector has been deteriorated when the second ratio is equal to or larger than a sixth threshold value.

8. The deterioration determination method according to claim 1, wherein, in the statistical processing step, statistical processing information of a part of the captured image is generated.

9. A deterioration determination method in a deterioration determination device configured to determine deterioration of an X-ray detector of an industrial X-ray imaging apparatus, the deterioration determination method comprising:
an acquisition step of acquiring a captured image generated by the X-ray detector;
a statistical processing step of generating statistical processing information of the captured image; and
a determination step of determining whether or not the X-ray detector has been deteriorated, based on the statistical processing information,
wherein, in the statistical processing step, statistical processing information of a part of the captured image is generated;
wherein the captured image includes a plurality of regions arranged in a first direction of the captured image;
wherein the X-ray detector includes an image sensor corresponding to each of the plurality of regions; and
wherein the part of the image corresponds to a part of a region in a second direction orthogonal to the first direction in each of the plurality of regions.

10. A deterioration determination device configured to determine deterioration of an X-ray detector of an industrial X-ray imaging apparatus, the deterioration determination device comprising:
an acquisition section configured to acquire a captured image generated by the X-ray detector;

a statistical processing section configured to generate statistical processing information of the captured image; and a determination section configured to determine whether or not the X-ray detector has been deteriorated, based on the statistical processing information, wherein the industrial X-ray imaging apparatus includes an X-ray source, and a stage which is disposed between the X-ray source and the X-ray detector and on which an imaging object is placed;

wherein the captured image includes at least one of a first captured image generated by the X-ray detector in a state where the X-ray source is turned off, and a second captured image generated by the X-ray detector in a state where the X-ray source is turned on and the imaging object is not placed on the stage;

wherein the statistical processing information is a first ratio indicating a ratio of an average value of luminance of the first captured image in a state where the X-ray detector is exposed to an average value of luminance of the first captured image when the X-ray detector is in an initial state; and wherein, in the determination step, it is determined that the X-ray detector has been deteriorated when the first ratio is equal to or smaller than a second threshold value.

11. A deterioration determination device configured to determine deterioration of an X-ray detector of an industrial X-ray imaging apparatus, the deterioration determination device comprising:

an acquisition section configured to acquire a captured image generated by the X-ray detector;

a statistical processing section configured to generate statistical processing information of the captured image; and a determination section configured to determine whether or not the X-ray detector has been deteriorated, based on the statistical processing information, wherein the industrial X-ray imaging apparatus includes an X-ray source, and a stage which is disposed between the X-ray source and the X-ray detector and on which an imaging object is placed;

wherein the captured image includes at least one of a first captured image generated by the X-ray detector in a state where the X-ray source is turned off, and a second captured image generated by the X-ray detector in a state where the X-ray source is turned on and the imaging object is not placed on the stage;

wherein the statistical processing information is a standard deviation of luminance of the first captured image; and wherein, in the determination step, it is determined that the X-ray detector has been deteriorated when the standard deviation is equal to or larger than a fourth threshold value.

12. A deterioration determination device configured to determine deterioration of an X-ray detector of an industrial X-ray imaging apparatus, the deterioration determination device comprising:

an acquisition section configured to acquire a captured image generated by the X-ray detector;

a statistical processing section configured to generate statistical processing information of the captured image; and a determination section configured to determine whether or not the X-ray detector has been deteriorated, based on the statistical processing information wherein the industrial X-ray imaging apparatus includes an X-ray source, and a stage which is disposed between the X-ray source and the X-ray detector and on which an imaging object is placed;

wherein the captured image includes at least one of a first captured image generated by the X-ray detector in a state where the X-ray source is turned off, and a second captured image generated by the X-ray detector in a state where the X-ray source is turned on and the imaging object is not placed on the stage;

wherein the statistical processing information is a standard deviation of luminance of the second captured image; and wherein, in the determination step, it is determined that the X-ray detector has been deteriorated when the standard deviation is equal to or larger than a fifth threshold value.

13. A deterioration determination device configured to determine deterioration of an X-ray detector of an industrial X-ray imaging apparatus, the deterioration determination device comprising:

an acquisition section configured to acquire a captured image generated by the X-ray detector;

a statistical processing section configured to generate statistical processing information of the captured image; and a determination section configured to determine whether or not the X-ray detector has been deteriorated, based on the statistical processing information, wherein the industrial X-ray imaging apparatus includes an X-ray source, and a stage which is disposed between the X-ray source and the X-ray detector and on which an imaging object is placed;

wherein the captured image includes at least one of a first captured image generated by the X-ray detector in a state where the X-ray source is turned off, and a second captured image generated by the X-ray detector in a state where the X-ray source is turned on and the imaging object is not placed on the stage;

wherein the statistical processing information is a second ratio indicating a ratio of a standard deviation of luminance of the first captured image to an average value of the luminance of the first captured image; and wherein, in the determination step, it is determined that the X-ray detector has been deteriorated when the second ratio is equal to or larger than a sixth threshold value.

14. A deterioration determination device configured to determine deterioration of an X-ray detector of an industrial X-ray imaging apparatus, the deterioration determination device comprising:

an acquisition section configured to acquire a captured image generated by the X-ray detector;

a statistical processing section configured to generate statistical processing information of the captured image; and a determination section configured to determine whether or not the X-ray detector has been deteriorated, based on the statistical processing information, wherein, in the statistical processing step, statistical processing information of a part of the captured image is generated;

wherein the captured image includes a plurality of regions arranged in a first direction of the captured image;

wherein the X-ray detector includes an image sensor corresponding to each of the plurality of regions; and wherein the part of the image corresponds to a part of a region in a second direction orthogonal to the first direction in each of the plurality of regions.

* * * * *